United States Patent [19]

Stanic

[11] Patent Number: 5,060,909
[45] Date of Patent: Oct. 29, 1991

[54] SHUT-OFF VALVE FOR FLUIDS

[76] Inventor: Miodrag Stanic, Muehlstrasse 19, D-6450 Hanau, Fed. Rep. of Germany

[21] Appl. No.: 328,076
[22] PCT Filed: Aug. 24, 1987
[86] PCT No.: PCT/EP87/00476
§ 371 Date: Feb. 13, 1989
§ 102(e) Date: Feb. 13, 1989
[87] PCT Pub. No.: WO88/01704
PCT Pub. Date: Mar. 10, 1988

[30] Foreign Application Priority Data

Aug. 25, 1986 [YU] Yugoslavia ............................ 1477/86

[51] Int. Cl.$^5$ .......................... F16D 7/02; F16K 31/44
[52] U.S. Cl. ..................................... 251/81; 137/454.5; 137/613; 251/229; 251/267; 251/272; 251/276; 464/37; 464/41
[58] Field of Search ................... 137/315, 454.2, 454.5, 137/454.6, 329.2, 329.4; 251/79, 81, 268, 270, 276, 278, 229, 267, 272, 288; 192/56 R; 464/31, 37, 41

[56] References Cited

U.S. PATENT DOCUMENTS

| | | | |
|---|---|---|---|
| 1,082,988 | 12/1913 | Wolff | 137/329.2 |
| 1,499,260 | 6/1924 | Stump | 137/329.2 |
| 3,006,361 | 10/1961 | Reinemann | 137/454.5 |
| 4,006,787 | 2/1977 | Rumpp et al. | 464/37 |
| 4,468,001 | 8/1984 | Stanic | 137/454.5 |
| 4,619,437 | 10/1986 | Williams et al. | 251/81 |
| 4,738,277 | 4/1988 | Thomas | 137/454.5 |
| 4,766,641 | 8/1988 | Daglow | 192/56 R |
| 4,778,149 | 10/1988 | Pesovic et al. | 137/454.5 |

Primary Examiner—George L. Walton
Attorney, Agent, or Firm—Jordan B. Bierman; Bierman and Muserlian

[57] ABSTRACT

The invention relates to a shut-off valve comprising a valve housing (12), a valve piston with valve cone (22) arranged up-stream of an associated valve seat (20), and a piston holder (16) axially movable within the valve housing (14) by means of a spindle (58) and accommodating said valve piston. To prevent overtightening of the valve piston, the piston holder (16) is connected to the valve housing (14) in the manner of a slip clutch. In addition, the outlet port (146) of the shut-off valve can be closed by a non-return valve.

17 Claims, 5 Drawing Sheets

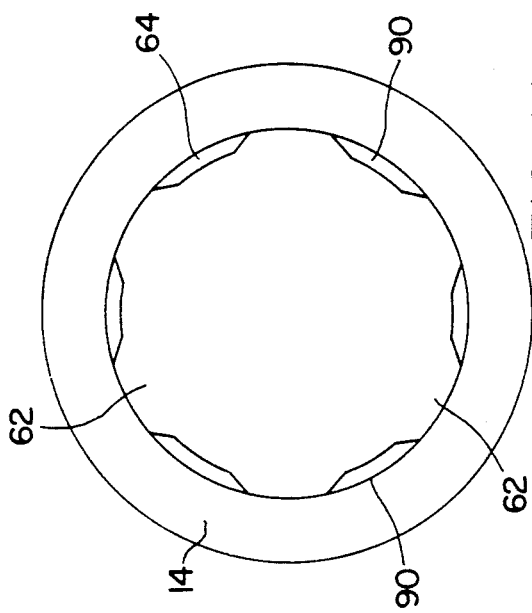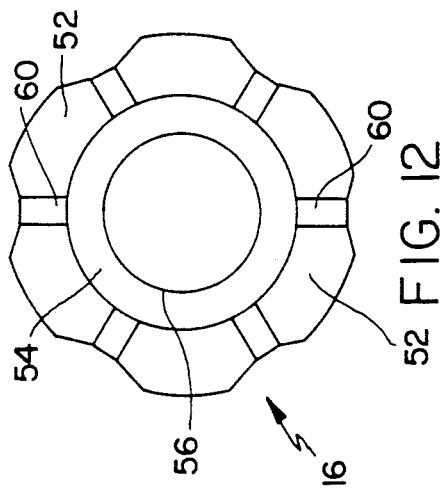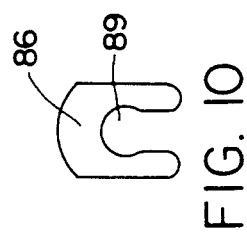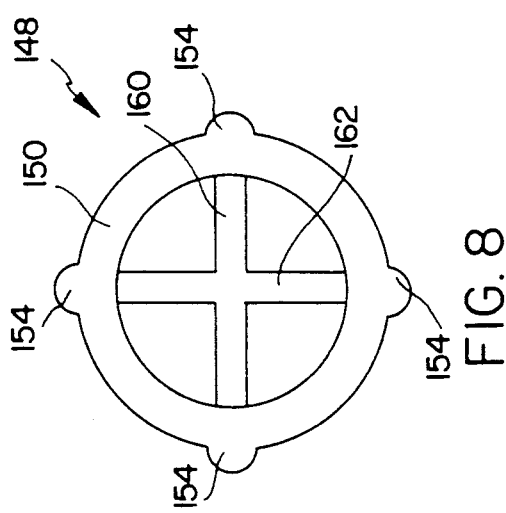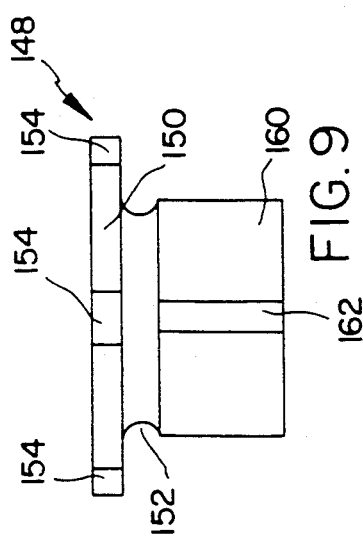

5,060,909

SHUT-OFF VALVE FOR FLUIDS

STATE OF THE ART

The invention relates to a shut-off valve for fluids comprising a valve housing, a valve piston with valve cone arranged upstream of an associated valve seat, and a piston holder accommodating the valve piston and being axially adjustable in the valve housing by means of a spindle, with the axial motion of the spindle holder being converted to a radial motion when the valve piston reaches a stroke limit.

A corresponding shut-off valve is disclosed in EP-B-0 073 855. By the arrangement of the valve cone in relation to the valve seat and the provision of a slip clutch preventing the valve from overtightening either in the opening or the closing position, a highly functional shut-off valve particularly for sanitation fittings is available. A corresponding valve can also be made of plastic, entailing considerable advantages over metal valves with regard to production and wear.

OBJECT OF THE INVENTION

The object of the present invention is to develop a shut-off valve of the type mentioned at the outset such that simple design measures preclude any "overtightening" of the valve, and also to ensure that simple assembly is possible of the elements making up the valve. It should also be avoided that foreign bodies can flow through the valve, with backflow through the valve being prevented in particular. Finally, the possibility should also be created to install the shut-off valve in fittings with non-standard dimensions.

The object is substantially achieved by providing the piston holder with axial projections on the outer wall which slide axially in associated axial recesses in the inner wall of the valve housing or which are movable into respectively adjacent recesses when the stroke limit is reached in order to achieve the radial motion. The recesses provided on the outer wall of the piston holder are preferably of "yielding" design here, in order due on the one hand to avoid unwelcome wear and tear without however straining the axial guideway, and on the other hand to ensure that the projections "jump" from recess to recess when the stroke limit is reached. The individual elements preferably comprise plastics such as polyacetates or polyamides, which have long service lives. As a result, the manufacturing costs of a valve in accordance with the invention can also be considerably reduced. There are also advantages as regards weight. In accordance with a further noteworthy embodiment of the invention, the piston holder is connected to the spindle or shaft by a retaining element which passes through a radial slot in the piston holder.

A proposal that is separately protected is that the port connecting a fluid-carrying fitting to the valve be closable by an element which is arranged coaxially to the valve piston and is axially movable, and which constitutes a non-return valve. Here, the element configured as a non-return valve is preferably movable underneath the valve seat and along the valve piston to make a sealing contact with a sector of the housing which in its turn accommodates the valve seat on the opposite side.

Also noteworthy is the separately inventive proposal for the valve cone to be mounted axially movable by a chamber of hollow cylinder type which in its turn abuts in sealing contact against a port provided inside the fitting. The advantage of this is that the valve seat itself does not have to extend in a tubular area of the fitting, which would involve a mutual adjustment of the dimensions.

Finally, the invention is distinguished in particular by the fact that length differences of the valve housing can be compensated by screwing a stop element preferably of cap nut type directly or indirectly onto the valve housing, where the axial movement of the stop element caused by the screw motion can be converted to an exclusively radial motion preferably depending on the torque to be applied for screwing. A slip clutch is therefore provided to ensure that no uncontrolled forces can affect the valve housing.

The claims contain further features which have separately inventive content per se and/or in combination.

DETAILED DESCRIPTION OF THE DRAWINGS

Figure 1:
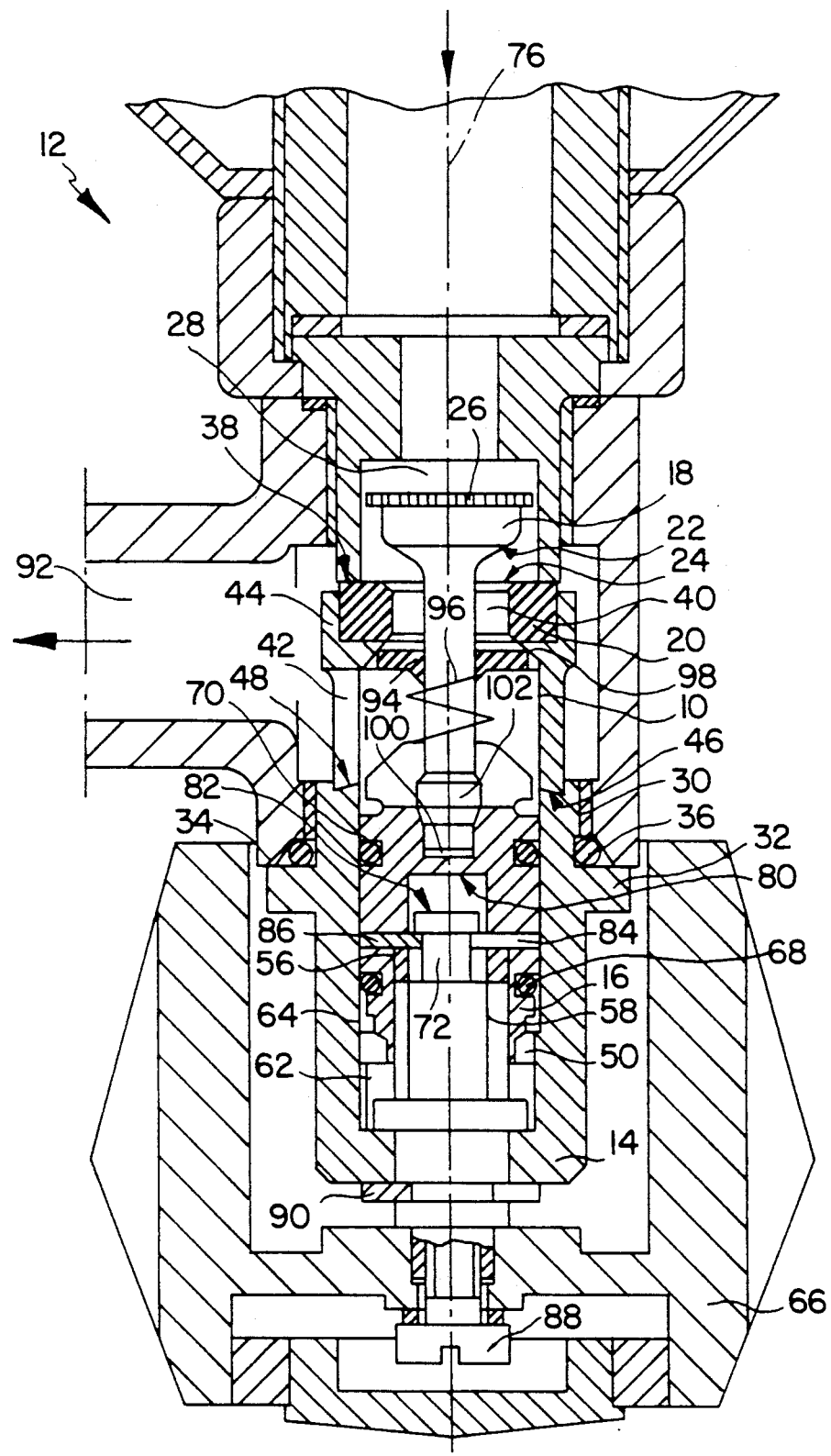

Further details, advantages and features of the invention are set forth in the following description of preferred embodiments illustrated in the drawings.

Figure 2:
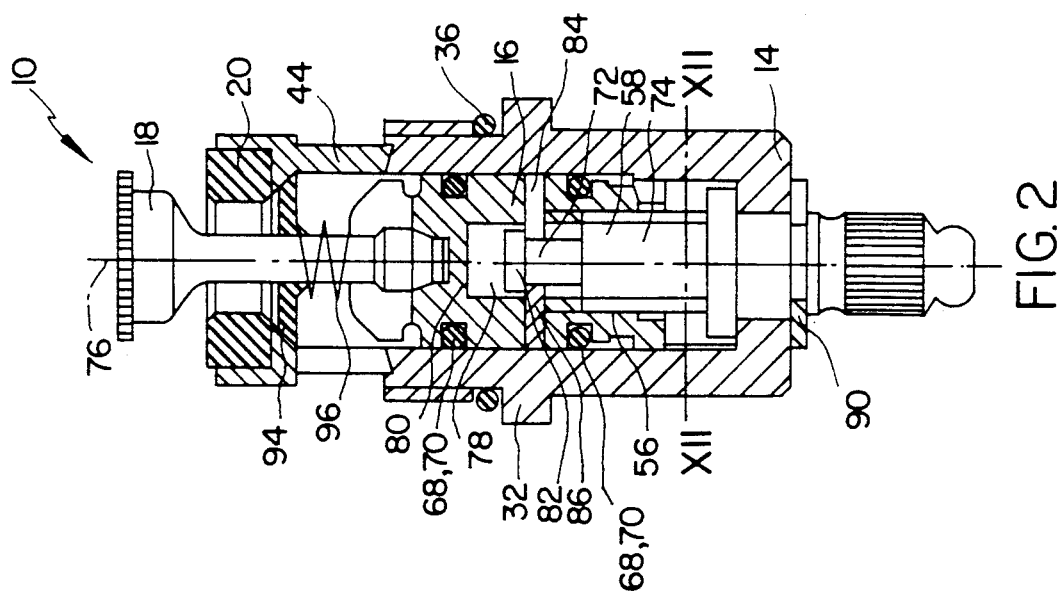
Figure 4:
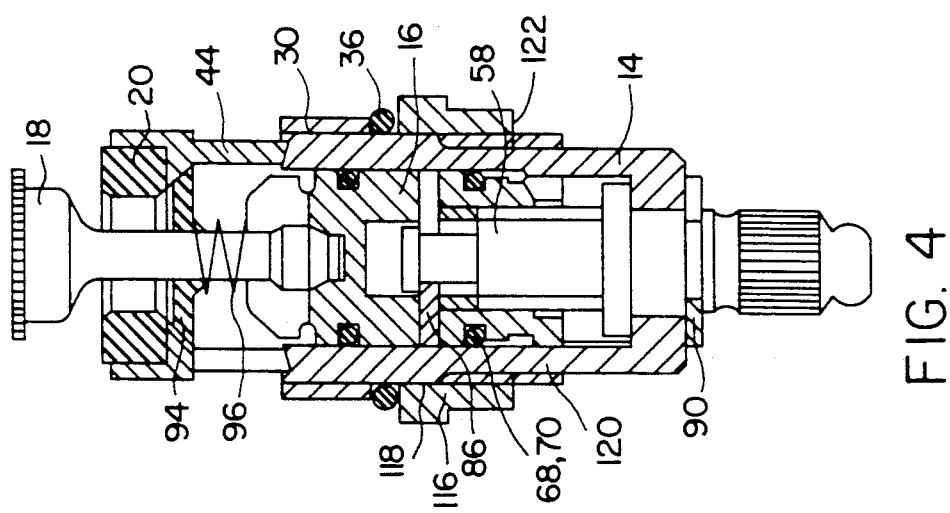
Figure 3:
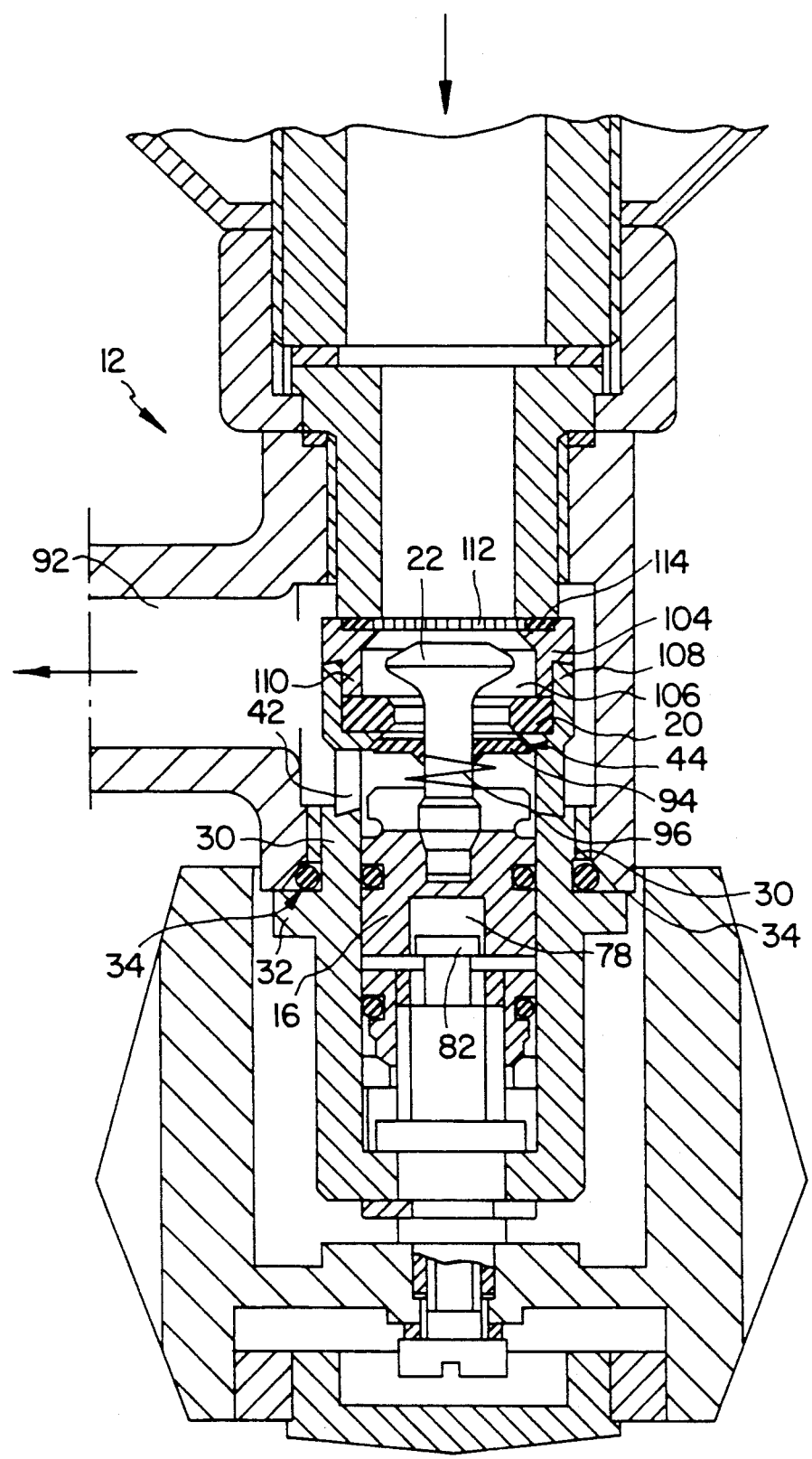
Figure 6:
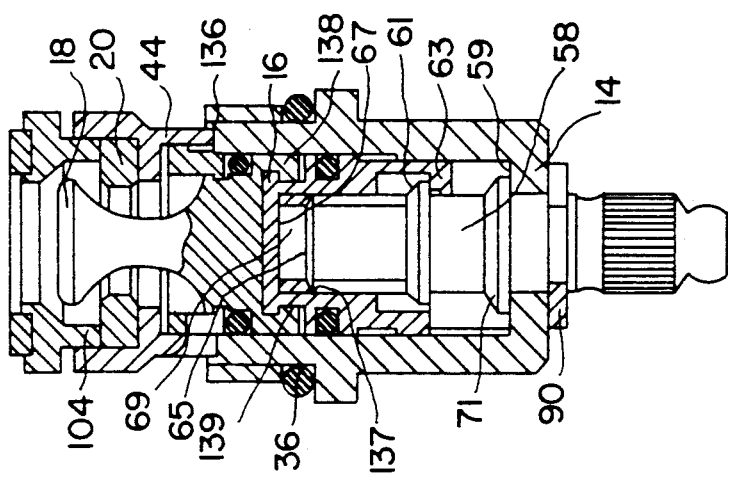
Figure 7:
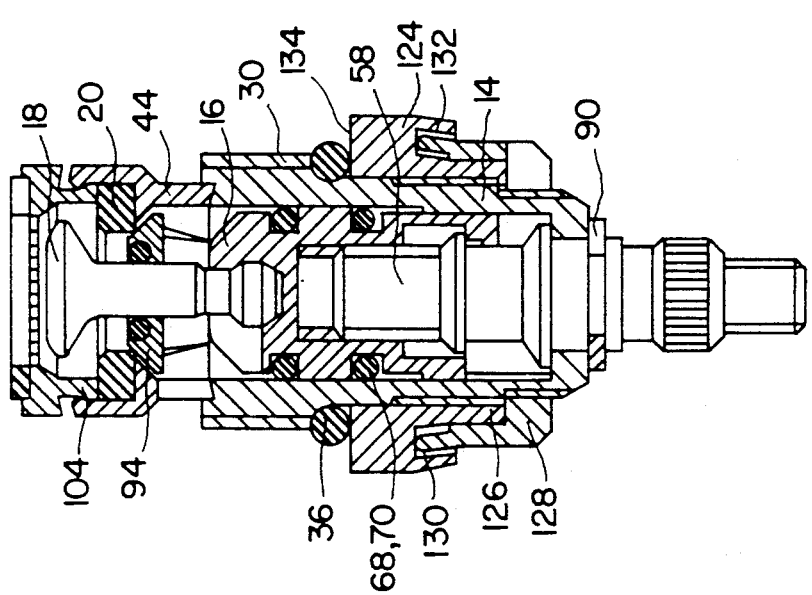
Figure 5:
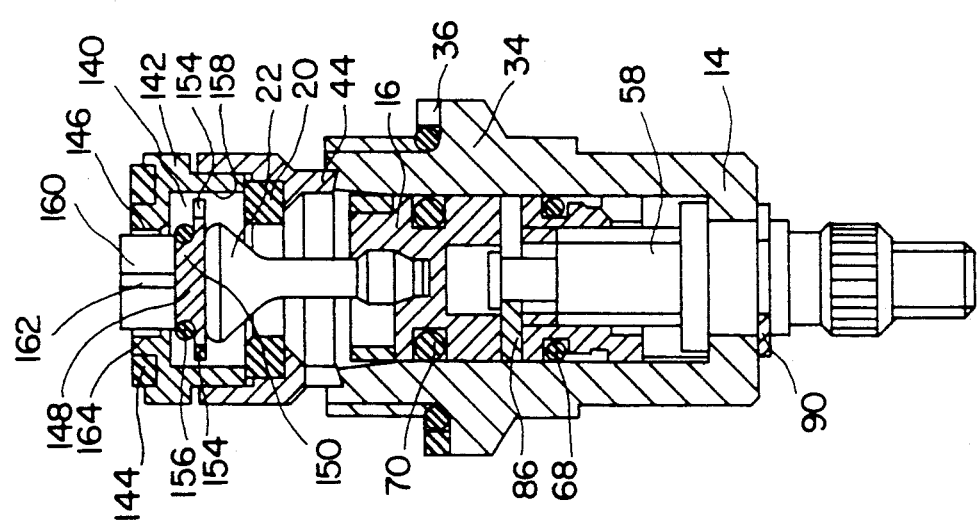

FIG. 1 shows a first embodiment of a shut-off valve arranged in a sanitation fitting, FIG. 2 shows the shut-off valve according to FIG. 1 without fitting, FIG. 3 shows a second embodiment of a shut-off valve arranged in a fitting, FIG. 4 shows a further embodiment of a shut-off valve whose effective length can be adjusted in relation to a fitting, FIGS. 5 to 7 show further embodiments of shut-off valves, FIG. 8 shows a plan view onto a closing element acting as a non-return valve, FIG. 9 shows a sectional view of the element in FIG. 8, FIG. 10 shows a retaining element for connecting the piston holder and the spindle, FIG. 11 shows a sectional view of the valve housing in the area of the line XII—XII in FIG. 2, and FIG. 12 shows a sectional view through the piston holder along the line XII—XII in FIG. 2.

Detailed Description of the Drawings

In the following description of preferred embodiments of shut-off valves and details of the latter, identical elements are provided with the same numbers for the sake of clarity.

FIG. 1 is a sectional view of a shut-off valve (10) installed in a sanitation fitting (12) such as a water tap, the individual components of which require no detailed explanation. The direction of flow with which a fluid passes through the fitting (12) and so the valve (10) is indicated by the arrows.

The shut-off valve (10) comprises a valve housing (14) in which a piston holder (16) is accommodated which in its turn holds in its front portion a valve piston (18) with valve head (22). The valve head (22) can be lowered onto or raised from a valve seat (20). In the sealing area to the valve seat (20), the valve head (22) is of conical design to achieve a good shut-off. On its free, flat end, the valve head (22) can have a disc-like element (26) through which fluid can pass but which rejects foreign particles. The element (26) is adjusted to the diameter of a pipe section (28) of the fitting (12) in which the valve head (22) is movable in such a way that a change in the direction of flow is largely precluded.

The valve housing (14) is screwed into the fitting (12) by means of a thread (30). As a limiting device, the valve housing (14) of hollow cylinder type has underneath the thread (30) an all-round projection (32) which abuts against a step (34) of the fitting (12) when the valve housing (14) is screwed in far enough. In this area, there is also an O-ring seal (36). If the valve housing (14) has been screwed in far enough, the distance between the projection (32) and the free end of the valve seat (20) ensures that the valve seat (20) is in sealing contact with a ring-like projection (38) of the fitting (12). As a result of this, it is ensured that the fluid can flow exclusively through the port (40) in the valve seat (20) and can then flow out of the fitting (12) through the outlet port (42).

With regard to the dimensions of the valve housing (14) or the projection (32), an adjustment to ½" or ¾" thread is preferably made.

The valve seat (20) is held by a hollow-cylindrical element (44) containing the outlet port (42), with the element being in its turn mountable on—and releasable from—the free edge (46) of the valve housing (14). To ensure reliable guidance and to prevent unwelcome slippage of the elements in relation to one another during installation in particular, the edge (46) is provided with a depression to which the facing edge (48) of the element (44) is adapted. The interaction is effected by means of steps.

For the valve head (22) to be lowered onto or raised from the valve seat (20) to the required extent, the piston holder (16) is arranged to be axially movable inside the valve housing (14) designed as a hollow cylinder. For this purpose, the piston holder (16) has at its rear end (50)—the bottom end in the drawing—projections (52) preferably arranged in a star pattern, as shown in FIG. 12. The projections (52) extend from a hollow-cylindrical inner wall (54) having a female thread (56) interacting with the male thread of a spindle (58). The projections (52), which are separated by slots (60) and so have a certain yield, engage in recesses (62) of the inner wall (64) of the valve housing (14). If the spindle (58) is now set in rotary motion by a handle (66) or the like, the piston holder (16) is forced to make an axial motion which is ensured by the interaction of the projections (52) with the recesses (62).

To permit a low-wear axial motion of the piston holder (16) along the inner wall (64) of the valve housing (14), support is afforded by sealing rings (68) and (70), so that not only easy movement is achieved, but also a seal which ensures that no fluid can penetrate between the valve housing inner wall and the piston holder (16).

The spindle (58) comprises a first external sector (72) and an adjacent further sector (74) of greater diameter with the male thread, which interacts with the internal thread (56) of the piston holder (16). The sector (72) is movable within a cylindrical recess (78) provided coaxially to the valve housing axis (76), the recess in its turn being limited by a wall (80) on the face side. The sector (72) has on its face a disc-like sector (82) of large diameter so that a step is formed between the sector (72) and the sector (82). A retaining element (86) having a 'U' shape in the plan view, as shown in FIG. 10, is now slid through a radial slot (84) from the outside of the piston holder (16) into the recess (78), with the sector (72) of spindle (58) being enclosed. Since the retaining element (86) is provided with a recess (89) corresponding to the diameter of the sector (72), it is ensured that when the spindle (58) is moved the external sector (82) cannot pass through the retaining element (86). This ensures a stroke limitation for the spindle (58) and thus of the piston holder (16) or valve piston (18).

This stroke limitation is determined on the one hand by the wall (80) and on the other by the retaining element (86), depending on whether the element (82) abuts against the wall (80) or against the disc-like retaining element (84). In the limit positions, it is ensured at the same time that the valve head (22) is either in sealing contact with the valve seat (20) or has the maximum distance from the valve seat (20) (see Figs.). In this case, further operation of the handle (66) and thus of the spindle (58) connected thereto by means of a screw (88) will no longer permit further turning in shut-off valves of conventional design: an unwelcome load on the valve cone or valve seat would occur instead (during the closing operation) or the handle would be excessively tightened. The result would be severe wear and tear and possibly irreparable damage. Under the terms of the invention, however, further turning of the handle (66) and thus of the spindle (58) is possible, since the projections (52)—designed to "yield" to a certain extent—now slide out of the recesses (62) over the raised portions (97) between the recessed on the inner wall of the valve housing (14) so that the rotary motion of the handle (66) is converted directly into a radial motion of the spindle (58), without there being a further axial shift of the piston holder (16) at the same time. This "jumping" action of the projections (52) over the raised portions (97) can however only take place when the disc-like sector (82) interacts either with the wall (80) or with the retaining element (86). Otherwise, the rotary forces transmitted by the spindle would not be sufficient for the projections (52) to jump over the raised portions (97) into other recesses (62).

As soon as the handle (66) is turned in the opposite direction, there is a direct axial motion of the piston holder (16) and thus of the valve piston (18) so that no time-lag occurs in the opening or closing motion.

A disc (90) arranged on the lower face of the valve housing (14) ensures that the spindle (58) itself is not axially adjustable.

To ensure that fluid cannot flow back through the outlet port (92) of the fitting (12) and back into the connected pipework, a sealing element (94) is provided that serves as a non-return valve. The sealing element (94) on the one hand encloses the valve piston (18) and on the other hand is moved by a spring element (96) in the direction of the valve seat (20). The disc-like sealing element (74) is designed as a collar and abuts in sealing contact against an inward-facing sector (98) of the cylinder-like element (74), which in its turn holds the valve seat (20) on the outside. The force of the spring element (96) is selected such that the port (40) through the element (94) is normally closed. This ensures that fluid penetrating through the port (92) cannot flow back into the piping system. The element (96) does not lift off from the sector (98) until the force exerted by the fluid flowing in the direction of the arrow exceeds that of the spring element (96), so permitting fluid to pass into the fitting (12) in the normal way.

The valve housing (14), the spindle or shaft (58), the piston holder (16), the valve seat (20), the valve piston (18) and the sealing element (96) are arranged recognizably coaxial to one another along the axis (76). The valve piston (18) is snapped into a recess (100) in the area of the piston holder (16) facing the valve seat (20).

For this purpose, the valve piston (18) has at its lower end a bulge-like reinforcement (102) which is placed in the recess (100) mentioned through slots (not shown). This not only ensures easy assembly, but also permits a relative movement between the elements. This results in a good seal between the valve seat (20) and the valve head (22). Should scale, for example, build up in this area, the valve head (22) can be tilted in order to permit an equalization and so ensure shutoff.

In FIG. 3, a further embodiment of the shut-off valve according to the invention is shown, also installed in a fitting (12). Unlike the embodiment according to FIG. 1, the element (44) of hollow cylinder design holding the valve seat (20) extends beyond the valve seat (20) in order to pick up a cup-like element (104) that bounds a chamber (106) in which the valve head (22) is axially movable. The connection between the elements (44) and (104) is made by fitting them together. For this purpose, sectors of wall (108) and (110) run parallel to one another and are seated on one another by means of steps. The walls (108) and (110) accordingly form external or internal walls of the elements (44) and (104) shaped as hollow cylinders in this area. The latter element is covered by a disc (112) which is permeable to a fluid but which rejects foreign bodies.

The valve housing closed off with the cup-like element (104) is now inserted into the fitting (12) in such a way that a tubular sector (114) abuts tightly against the face of the element (104) to ensure that the fluid can pass exclusively in the direction of the arrow through the chamber (106) to the outlet port (42) or (92). The advantage of this configuration is that the valve head (22) in the chamber (106) is movable, without an adjustment being made to the fitting (12); normally, the valve head (22) moves within a tubular sector of the fitting (12) as in made clear in FIG. 1 too.

In FIG. 4, a further noteworthy and independent variant of the invention is shown. To permit change of the distance between the fastening areas of the shut-off valve in the fitting, i.e. between the valve seat (20) and the projection (32) in the embodiment according to FIG. 1, a stop element (118) in the form of a cap nut and also having a projection (116) outwards is provided which can be screwed onto a thread (122) of an intermediate element (120) which in its turn is designed as a hollow cylinder and is mounted on the outer wall of the valve housing (14). It is possible to connect the element (120) and the valve housing (14) in the manner of a slip clutch, so that the torque is limited when the element is being screwed on if non-permissible forces are applied. The slip clutch can be designed as a system of interacting projections and recesses, whereby the projections jump into adjacent recesses—i.e. the thread (122) carries out an exclusively radial motion—when the applied screw forces exceed a set value.

FIG. 7 shows a variant of a stop element (124). The stop element can be screwed to the outer wall of the valve housing (14) using a thread (126). In the lower portion, the stop element (124) is surrounded by a kind of retaining nut (128) which engages with its upper free end (130) in a recess in the lower edge such as the groove (132) all round the stop element (124). At the lower end, the element (128) is supported by the outer wall of the valve housing (14). Around the groove (132), element (124) and thread (128) interact as a kind of slip clutch. The free end (130) engaging in the groove (132) has projections—not shown—extending from it that engage in recesses on the inner wall of the groove (132). If the retaining nut (128) is now gripped on the outside and set in rotary motion, the stop element (124) is moved towards or away from the seal (36) depending on the direction of rotation. As soon as the projection (134) contacts a stop—not shown—in a fitting and is firmly abutting against it, the slip clutch comes into action; this means that the projections of the retaining nut (128) jump from recess to recess inside the groove (132) and so transmit the rotary motion of the retaining nut (128) to the stop element only in such a way that the stop element (124) as cap nut carries out an exclusively radial motion. It is accordingly possible with this embodiment of the shut-off valve according to the invention to adjust it to fittings with non-standard dimensions.

FIG. 6 shows an embodiment relating to the connection between the valve piston (18) and the piston holder (16). The valve piston (18) is fitted onto the piston holder (16) in such a way that there is a coaxial relative movement between the two elements, i.e. they can be rotated against one another along a common surface about the valve axis. For this purpose, the piston holder (16) has a cap-like end section (136) formed by an all-round groove (137) and surrounded by a suitably shaped bottom section (138) of the valve piston (18) in such a way that the free coaxial motion is possible. In other words, the sector of the valve piston (18) facing the piston holder (16) is designed as a hollow cylinder with the edge (139) facing inwards. This edge is partially removed to allow it to be fitted laterally onto the end section (136). The inward-facing edge then engages in the groove. The mode of connection between the valve piston (18) and the piston holder (16) can be regarded as a radially extending dovetail connection. This design ensures that a rotary motion of the piston holder (16) is possible when the valve piston (18) is frozen tight, for example, so precluding any breakage of the valve piston (18).

FIG. 6 also shows a further especially noteworthy feature relating to the connection between the piston holder (16) and the spindle (58). In comparison with the embodiment in FIG. 1, the spindle (58) is not releasably connected by a retaining element; instead the spindle (58) has a bulge (61) surrounding it at a distance from the inner wall (59) on the bottom side, said bulge being gripped from behind by two sectors (63) of the piston holder (16) projecting in the direction of the spindle (58) and preferably arranged diametrically (it is of course also possible to provide one surrounding sector or more than two sectors). The connection between the piston holder (16) and the spindle (58) can be seen in the form of a snap fastening. The connection itself must be made outside the valve housing (14) in order to then slide the unit of piston holder (16)/spindle (58) axially into the valve housing (14), as otherwise the sectors (63) can no longer grip behind the bulge (61). (Between the sectors (63) forming diametrically arranged projections, preferably two further diametrical projections facing outwards are provided which interact with the grooves provided axially in the inner wall of the valve housing to form the slip clutch described in FIG. 1.)

The bulge (61) itself also limits the stroke of the piston holder when the bulge (61) abuts against the inward-facing sector (63). In this position, the valve is completely opened in the embodiment according to FIG. 6. The other limit position of the piston holder (16) and thus of the valve piston (18) is achieved when the internal and free face wall (65) interacts with a bottom wall (67) of a recess (69) in the piston holder (16), with the cylindrical recess (69) surrounding the spindle (58). In this area, the spindle has a male thread and the inner wall of the recess (69) a female thread, to effect the required axial motion of the piston holder (16) when the spindle (58) make a rotary motion.

The advantage with this connection of spindle (58) and valve holder (16) is that apart from the bulge (61) and a bulge serving as a limit (71) and abutting against the bottom surface (58) of the valve housing (14), the diameter of the spindle (58) is constant. The result of this is extreme stability. There is also the advantage that use in industrial valves in particular is possible. FIG. 5 illustrates a shut-off valve where the valve head (22) is arranged movably in a chamber (140) which is bounded by an element (142) designed in cup form and having cylindrical walls, and which corresponds to the element (104) in FIG. 3. On the face side, the element (142) has an all-round seal (144) which is in sealing contact with a sector of a fitting, in the same way as the seal (36) on the step (34) of the valve housing (14). The face side of the element (142) has a port (146) through which fluid can flow. This port (146) is now closed by an element (148) which serves as a non-return valve. The element (148), shown in greater detail in FIGS. 8 and 9, has a disc-like base element (150) which can close the port (146) tight on the valve side. For this purpose, a sealing ring (156) can be inserted additionally in an all-round groove (152). The diameter of the disc-like base element (150) is also greater than the clear diameter of the port (146). FIG. 5 shows that the disc-like base element (150) abuts against the valve head (22) surface which is flat on the outside and vertical to the longitudinal axis of the valve. In order however to prevent any sticking of the element (148) inside the chamber (140), four projections (154) extend from the base element (150) and slide along the inner wall (158) of the chamber (140), i.e. of the cup-like element (142). In addition, projections (160) and (162) extend from the base element (150) that are formed by webs and that intersect at right angles, giving a cross-like pattern in the plan view, these projections (160) and (162), termed wings, slide along the inner wall (164) of port (146), which also ensures that tilting is prevented. If a fluid now flows through the port surrounding the valve seat (20) against the normal flow direction into the chamber (140), the element (148) is gripped and so seals the port (146).

Although the embodiments describe the invention on the basis of a sanitation fitting, applications in a wide variety of fields are possible. Preferred applications are physics or chemistry laboratories where shut-off valves are used for regulation of liquids and gases. Particularly the fact that the shut-off valve in accordance with the invention is constructed of plastic affords the advantage that it can be used wherever corrosive fluids are encountered. Since the design and the material are only subject to minor wear, and overtightening of the valve—in whatever direction—is not possible, the shut-off valve under the terms of the invention requires very little maintenance and ensures a high degree of functionality.

I claim:

1. A shut-off valve for fluids comprising a valve housing, a valve piston with valve element arranged upstream of an associated valve seat, and a piston holder having an end connected to a spindle and having another end connected to said valve element, said piston holder being axially movable within said valve housing by means of a spindle and accommodating said valve piston, axial motion of said piston holder being converted into rotational motion of said piston holder when said valve piston reaches a stroke limit at either an open or close position of said valve element, wherein said piston holder has on its outer wall, axial projections which slide axially in associated axial recesses formed in an inner wall of said valve housing and are deformable so as to be movable into adjacent recesses when said stroke limit is reached, thereby achieving only rotational motion of said piston holder, whereby over-torquing is reduced.

2. A shut-off valve according to claim 1, characterized in that the piston holder (16) has in its centre an axial recess (78) into which a first sector (72) of the spindle (58) projects, and that said piston holder is axially adjustable in relation to said first sector and is releasably connected in the recess to said spindle by a retaining element (86).

3. A shut-off valve according to claim 2, characterized in that the first sector (72) has a smaller diameter than the recess (78), that said first sector is limited on the outside by a disc element (82) and on the inside by a further sector (74) of the spindle (58) having a greater diameter in each case, and that the stroke motion of the piston holder (16) is limitable by interaction of the retaining element (86) with said disc element or with said further sector.

4. A shut-off valve according to claim 3, characterized in that the retaining element (86) is a disc which is insertable into the recess (78) through a radial slot in the wall of the piston holder (16) in order to enclose the first sector (72).

5. A shut-off valve according to claim 3, characterized in that the stop element (124) and the cap nut have a female thread and are screwable onto a male thread (126) provided on the outer wall of the valve housing, that said stop element is surrounded in sectors by a hollow cylinder element (128) via which the torque is transmitted, that said stop element has projections which engage in associated recesses of said hollow cylinder element, where the projections are movable into respectively adjacent recesses to achieve the exclusively radial motion and vice versa.

6. A shut-off valve according to claim 5, characterized in that the stop element (126) has a groove (132) extending in the direction of the hollow-cylindrical element (128), into which groove said element engages to transmit the torque.

7. A shut-off valve according to claim 1, characterized in that the port (146) connecting a fitting (12) carrying fluid and the valve (10) is closable by an element (94, 148) arranged coaxially to the valve piston (18), axially adjustable, and constituting a non-return valve.

8. A shut-off valve according to claim 7, characterized in that the element (94) surrounds the valve piston (18) and is pressable via a spring element (96) against a valve housing sector (44) accommodating the valve seat (20).

9. A shut-off valve according to claim 7, characterized in that the element is designed as a perforated disc (94) having its outside edge (98) facing the valve head (22) angled, said edge being applicable to an all-round valve housing sector extending in the direction of the valve piston, said sector in its turn serving to support the valve seat (20).

10. A shut-off valve according to claim 1, characterized in that the valve head (22) is movably arranged in a chamber (106, 140) extending from the valve housing (14), said chamber in its turn abutting in sealing contact against the face of a sector of a fitting.

11. A shut-off valve according to claim 10, characterized in that the hollow-cylindrical chamber (140) has a fluid entry port (146) which is arranged coaxially to the valve piston and which is closable by the element (148) serving as a non-return valve and being axially adjustable within said chamber.

12. A shut-off valve according to claim 11, characterized in that the element (148) comprises a disc-like base element (150) which completely closes the entry port (146) to the required extent, that first projections (154) extend from the base element and slide along the internal wall (158) of the chamber (140), and that second projections (160, 162) from the base element surface facing said entry port extend into said entry port to achieve a controlled axial motion of said element.

13. A shut-off valve according to claim 12, characterized in that the second projections (160, 162) form a cross in the plan view.

14. A shut-off valve according to claim 1, characterized in that the valve piston (18) is mounted on the side of the piston holder (16) in such a way that their coaxial rotation relative to one another is feasible.

15. A shut-off valve according to claim 1, characterized in that the external wall of the valve housing (14) is surrounded at least in sectors by a stop element (116, 124) having a female thread and being indirectly or directly screwable onto said valve housing, and that the axial motion of said stop element caused by the screwing operation is converted into an exclusively radial motion depending on the torque required for the screwing operation.

16. A shut-off valve according to claim 13, characterized in that the stop element (116) is screwable onto a hollow cylinder (122) enclosing the valve housing (14), said cylinder in its turn being connected by projections and/or recesses to said valve housing in such a way that exclusively radial rotatability is achieved or prevented depending on the torque acting on said stop element.

17. A shut-off valve according to claim 16, characterized in that the fluid entry port of the chamber (106) is covered by a fluid-permeable, foreign particle-resistant disc (112).

* * * * *